United States Patent [19]
Ahlm et al.

[11] Patent Number: 5,745,775
[45] Date of Patent: Apr. 28, 1998

[54] REMOTELY ADJUSTABLE PRICE DISPLAY MODULE

[75] Inventors: Roger Ahlm, Motala; Ola Ödmark; Björn Nilsson, both of Upsala, all of Sweden

[73] Assignee: Pricer Inc., Norwalk, Conn.

[21] Appl. No.: 871,434

[22] Filed: Jun. 9, 1997

Related U.S. Application Data

[63] Continuation of Ser. No. 436,209, filed as PCT/SE93/00936, Nov. 13, 1992 published as WO94/11833, May 26, 1994, abandoned.

[30] Foreign Application Priority Data

Nov. 13, 1992 [SE] Sweden ............................ 9203409

[51] Int. Cl.$^6$ ...................................................... G06F 1/26
[52] U.S. Cl. ............................ 395/750.08; 340/825.35
[58] Field of Search ......................... 395/750.01, 750.03, 395/750.05, 750.08, 222, 228; 235/383; 340/825.35; 364/707, 464.01

[56] References Cited

U.S. PATENT DOCUMENTS

| | | | |
|---|---|---|---|
| 4,317,181 | 2/1982 | Teza et al. | 364/707 |
| 4,766,295 | 8/1988 | Davis et al. | 235/383 |
| 5,386,577 | 1/1995 | Zenda | 395/750 |
| 5,442,343 | 8/1995 | Cato et al. | 340/825.35 |
| 5,465,085 | 11/1995 | Caldwell et al. | 340/825.35 |

FOREIGN PATENT DOCUMENTS

| | | | |
|---|---|---|---|
| 0228377B1 | 2/1991 | European Pat. Off. | G09G 3/36 |
| 8405140-8 | 10/1985 | Sweden . | |
| WO90 13067 | 1/1990 | WIPO . | |

*Primary Examiner*—Glenn A. Auve
*Attorney, Agent, or Firm*—Young & Thompson

[57] ABSTRACT

A method is provided for displaying prices of articles on display units adjacent to the location of the articles at a point of sale. The method is useful in operating a number of detached display units, which reproduce information, which is changeable by a wireless communication from a central computer or a portable terminal. A problem related to information systems of this type consists in easily and conveniently providing for assigning an identification code corresponding to a particular article to a display unit. According to the method described herein, this is achieved by a control unit, integrated within the display unit, and being able to be set by an external switch or signal, the control unit in such set state being arranged to receive and to store an identification code transmitted from the portable terminal.

9 Claims, 2 Drawing Sheets

REMOTELY ADJUSTABLE PRICE DISPLAY MODULE

This application is a continuation of application Ser. No. 08/436,209, filed as PCT/SE93/00936, Nov. 13, 1992 published as WO94/11833, May 26, 1994, now abandoned.

TECHNICAL FIELD

The present invention relates to information systems for displaying prices of articles on display units adjacent to the location of said articles at a point of sale. More particularly, the invention relates a method using of a monitoring module to supply power in the above mentioned type of detached display units, which reproduce the information stored in the respective unit, and which information is changeable by a wireless communication from a central computer or from a portable terminal.

PRIOR ART

An example of a known system of this type is for example disclosed in the Swedish patent application 8405140-8 and the corresponding international patent application having a publication number WO 86/02477.

Most of the early systems used a built-in battery to supply power to the different detached displaying units, which meant that the units at regular intervals had to be taken down from the edge of for example a shelf in the store to be able to exchange its battery. Due to modern electronic using CMOS technology and liquid crystal displays (LCD) it has been possible to design presentation display unit having a very lower power consumption. This means that also solar powered display units became a reality. But there are still functions which demand rather high power, for example the communication circuitry comprising at least a receiver and most probably also a transmitter to acknowledge received information. This means that still often a battery has been combined with a solar cell to supply the peak current necessary in the communication mode.

Consequently a problem to be solved in connection with information systems of the above mentioned kind, is to provide power supply for the different display units without recurring and tedious battery replacement procedures.

DESCRIPTION OF THE INVENTION

According to the invention, this problem is solved by normally supplying power to the display units by means of photoelectric converters producing current to operate the unit and to charge for example a capacitor or an accumulator whenever sufficient lighting is available. The display unit will normally maintain and display the latest information transmitted for a long period of time through energy supply only from the accumulator after that the lighting has been switched off or has become insufficient. This period of time will be further extended if the display unit is arranged to switch automatically to a state of low power consumption when supplied exclusively from the accumulator.

According a first object of the present invention a switching between a low power state and a high power state for a detached display unit is performed by means a monitoring module.

According to a second object of the present invention when switched to the state of low power consumption, the display unit will remain in this state for a predetermined period of time.

According to a third object of the present invention only the necessary circuits for maintaining the display and for maintaining information in the display unit will be power supplied in low power driving.

Additional advantages will be achieved when current supply is realized from the photoelectric converters, in that the display unit is arranged to at times disconnect high current consuming portions without essentially changing its operation, as this means that the photoelectric converters and the accumulators may be given smaller values and dimensions, which also affects the size of the entire display unit. This will be further clarified through the description and the claims stated below.

Particularly advantageous embodiments of an information system having detached display units will be obtained if several of the actions stated above are implemented within the same system. Although not interdependent, in combination they will provide such advantages, that a system highly adapted to its purpose and a most advantageous realization of the display units will be achieved.

DESCRIPTION OF THE DRAWINGS

The invention will now be explained more in detail with reference to the drawings, wherein FIG. 1 schematically shows a system of the invention, Fig. 2 schematically shows the way the power supply can be switched in a display unit according to the invention and the way a portion of the load can be disconnected, FIG. 3 schematically shows, in the form of a diagram, the way the communication between the main unit and the display units may be arranged to save power consumption according to the invention.

DESCRIPTION OF A PREFERRED EMBODIMENT

Figure 1:
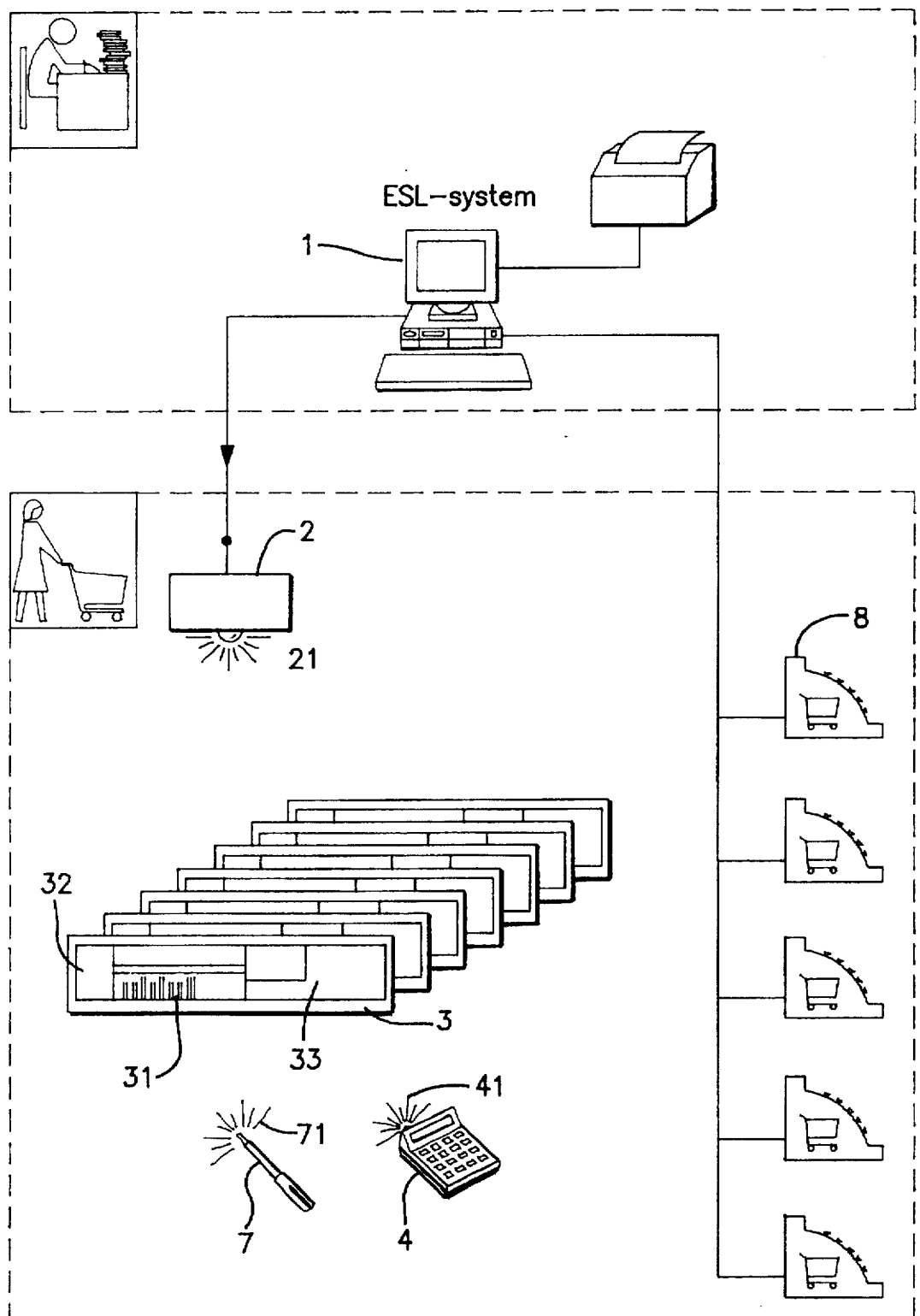

The system to which the present invention is applied, substantially based on the system of the Swedish Patent document mentioned in the introduction, comprises, as shown in FIG. 1, a control unit 1, which can be a store computer to which the cash-register terminals 8 and, possibly, other terminals are connected in a well-known manner to store and register prices together with article identification. The control unit 1 is connected to a transmitter unit 2, which, according to a predetermined sequence, by a transmitter 21 transmits an output signal. The transmitter 21 may preferably consist of diodes emitting infrared light, but may optionally consist of another suitable wireless information transmitter. A display unit 3 having a basic function comprises, when seen from the outside, a receiver 31 of the wireless information, a photoelectric converter unit 32 for power supply and a display 33, which units are connected to other built-in components to store information received by the receiver 31 and to display stored information on the display 33. The display unit 3 is arranged in a well-known manner to exclusively store received information of the type, that possesses an address portion corresponding to the relevant display unit and that satisfies, in other aspects, the display unit built-in check functions in the form of check sums etc. Only a few display units 3 are shown in FIG. 1, but normally, however, a large number of display units are arranged, each of those having its own address code, which is individually programmed prior to use. In a large store, the number may reach several thousands, which are controllable from a single control unit 1 having one or more transmitters 21. A hand terminal 4 having a transmitter 41 or a light pen 7 normally used when only one display unit is to be checked and may be used optionally to change parameters in a display unit, e.g. to initiate the identification code of the display unit.

The display unit is functionally designed, so that an identification code initially can be stored in a memory or register. The identification code is utilized, so that the identification code of a received signal, which from the receiving unit is temporarily stored by the control unit in a code register, is compared with the stored one, and, should a correspondence exist, received values will be stored instead of the previously stored ones, this being realized by means of conventional technique. Before any identification code has been stored in a display unit, it is not possible to access it from the control unit. A hand terminal is therefore often utilized to initiate a display unit and to store its identification code. This method is realized as follows. Initially, the display unit is set to receive and store a new identification code by switching the control unit of the display unit to a state of initiation. This switching may be realized in different ways. The simplest way is to provide the display unit with a kind of switch, which is affected by a push-button on the display unit. This is not a good solution, since visible push-buttons on the display unit constitute an encouragement of unnecessary manipulation thereon, possibly leading to wear and improper displaying. According to an embodiment of the present invention, the display unit is thus provided with a hidden switch for the switching to the state of initiation. This switch is preferably disposed behind the photoelectric cell 32 of the display unit, so as to be influenced by pushing the cell 32. In order to avoid unintentional influence, the control unit may be arranged in a manner to sense a certain number, e.g. three operations of the switch prior to the switching of the control unit to a state of initiation. As an alternative, a delay circuit may be arranged in such a way, that the control unit switches only after that the switch is being influenced for a certain period of time.

An essential function of the display unit is constituted by the return from the state of initiation to the normal state. The display unit is preferably arranged so that this return is realized automatically directly upon the reception of a new identification code or, provided no such code is received, after a predetermined period of time, e.g. approximately one minute. This prevents a plurality of display units from simultaneously receiving the same identification code.

There is also an alternative method of setting the control unit to the state of initiation or another state or to another mode of operation functionally differing from the normal position. This method has the advantage of not having to utilize any mechanically influenceable switch. Instead, a particular circuit is connected to the photoelectric converter or solar cell of the display unit, so that the control unit receives a switching signal when the solar cell is exposed to lighting again after having been blocked for a short period of time. This switching signal may be achieved by covering the solar cell for a short moment. The short-term drop of its output voltage followed by a rise, can provide the switching signal by means of a suitable electronic circuit of a wellknown type. If then the control unit has been set for the state of initiation, the address information will have to be transmitted within a predetermined period of time, prior to the control unit resetting again for the normal state.

Irrespective of which of the above-mentioned methods that is utilized, the reprogramming of the identification code is preferably achieved by reading of the code on the article, to which the display unit is to relate, by means of a hand terminal or a light pen and that the hand terminal is set to transmit a signal to the display unit when its control unit has been initiated for receiving. The signal to the display unit constituting the identification code is preferably composed by the article code and further code elements, which are unique to the system and the installation in question.

At this time, the invention has only been indicated schematically. It is however obvious that a person skilled in the art will be able to realize it in different ways by utilizing generally well-known components or components specially designed for this purpose.

Figure 2:
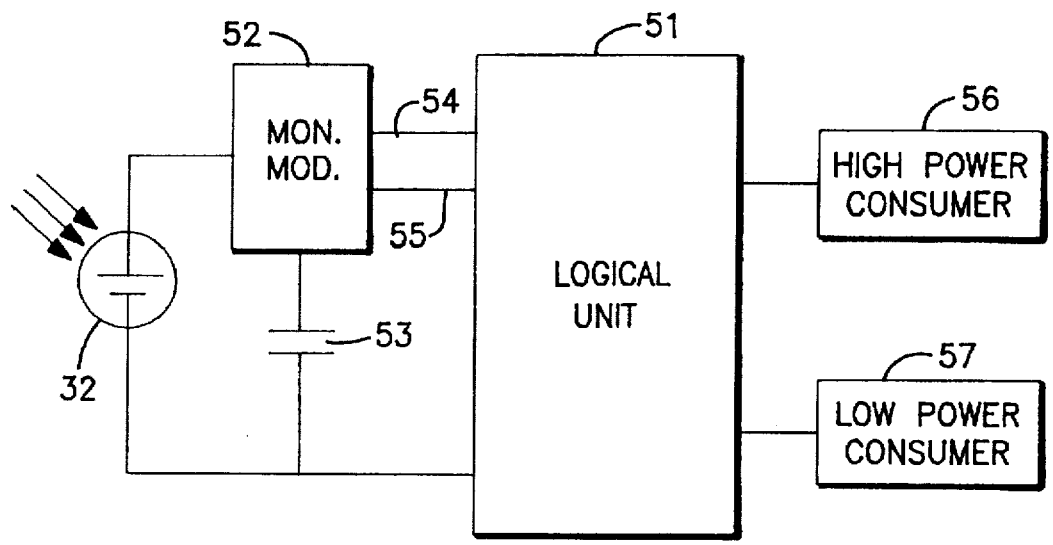

FIG. 2 indicates schematically the switching of the power supply. A photoelectric converter 32 normally drives the components of the display unit, which as a whole have been designated as a logical unit 51 and consumers connected thereto in the form of high power consumers 56 comprising receivers and possibly transmitters of acknowledgement signals, and low power consumers 57, mainly comprising the display. A monitoring module 52 is connected between the converter 32 and an energy storage unit 53, the monitoring unit 52 being arranged to produce a high level signal to the logical unit 51 at the connection 54 when the output voltage of the converter 32 exceeds the output voltage of the energy storage unit 53, and a low level signal at the connection 55 when it is below this voltage. The logical unit 51 is preferably arranged to include a delay, after which the high power consumers 56 are disconnected once the logical unit has received a low level signal. Also, in the preferred embodiment the display unit is designed in a manner to dispose a particular element, which becomes visible when the display unit is set to the low power state, i.e. when a low level signal is received on the connection 55 and when the logical unit 51 disconnects high power consumers 56. By means of this element, for instance, a simple possibility to monitor the function of the display module will be obtained.

Figure 3A:
Figure 3B:
Figure 3C:

As shown in FIG. 3 A, a display unit representing a preferred embodiment of the present invention is provided with a receiver, which is normally energized for a period of time t and then switched off, should no signal of the correct type have been received, to be kept switched off for the period of time of n times t. As shown in FIG. 3 B, the control unit 1 starts transmitting at time T. The display units are thereby arranged to keep the receiving function energized according to what is indicated in FIG. 3 C, i.e. the receiver remains switched on after the normal switching-on period of time t, which occurs after the start of the transmitter. In order to ensure that all receivers are definitively switched on and ready to receive information changes from the central ESL-system 1, the transmitter 2 will first, at least for the period of time of n times t, have to transmit information to alert the receiver to stay activated before transmitting the information change which is required to reach its destination reliably. In order to prevent the receivers of the display units from trigging on various, possibly present disturbance signals, these are arranged, so that a predetermined signal form determining the system approved signal exclusively affects the receivers. The number n has to be greater than 1, preferably at least 8, to achieve substantial energy saving. In conjunction with tho circuitry described in connection with FIG. 3, additional energy-saving is achieved. The display units are also preferably provided with a transmitter for providing a reply signal to the control unit, when information has been received.

The invention has now been described functionally in detail with reference to drawings relating to embodiments. The more detailed realization can be achieved by a technique, which is well-known to a person skilled in the electronic art. The possibility of an arbitrary combination of the different embodiments in order to produce an efficient and appropriate system is also intended to lie within the scope of the invention.

We claim:

1. A method for supplying power from a photoelectric converter to a detached price display unit lacking powering battery, the detached price display unit having high power consuming portions and low power consuming portions, said high power consuming portions and said low power consuming portions including a number of functional units, comprising the steps of:

providing a monitoring module;

providing an energy storing unit;

providing the detached price display unit in such a way that when said detached price display unit is in a high level driving state said detached price display unit will have all said functional units connected, while in a low level driving state functional units, of said number of functional units, being most energy demanding will be disconnected;

connecting via said monitoring module said photoelectric converter parallel to said energy storing unit and said energy storing unit via said high power consuming portions to the detached price display unit if said photoelectric converter delivers at least the same voltage level as said energy storing unit; and disconnecting by means of said monitoring module said photoelectric converter and connecting said energy storing unit to the detached price display unit via said low power consuming portions if said photoelectric converter does not deliver at least the same voltage level as said energy storing unit.

2. The method according to claim 1, comprising the further step of supplying power only to circuits necessary for a display of said detached price display unit for maintaining information in the detached price display unit when in said low level driving state.

3. A method for supplying power from a photoelectric converter to a price display unit, wherein a monitoring module connects the photoelectric converter to said price display unit and an energy storing unit charged by said photoelectric converter, comprising the steps of:

monitoring voltage level of the photoelectric converter and voltage level of the energy storing unit;

connecting, by means of said monitoring module, the photoelectric converter (a) parallel to said energy storing unit, and (b) to said price display unit through high level circuitry of said monitoring module, if said photoelectric converter delivers at least the same voltage level as said energy storing unit; and disconnecting, by means of said monitoring module, said photoelectric converter, and connecting said energy storing unit to said price display unit through low level circuitry of said monitoring module, if said photoelectric converter does not deliver at least the same voltage level as said energy storing unit.

4. A method of supplying power to a price display unit having a plurality of functional components, comprising the steps of:

monitoring voltage level delivered by (a) a photoelectric converter and (b) an energy storing unit energized by said photoelectric converter;

connecting said photoelectric converter, through a monitoring module, (a) parallel to said energy storing unit, and (b) to said price display unit by high level circuitry of said monitoring module to operate all of said functional components, when the voltage level delivered by said photoelectric converter is at least the same as the voltage level delivered by said energy storing unit; and disconnecting said photoelectric converter from said price display unit, and connecting said energy storing unit, through said monitoring module, to said price display unit by low level circuitry of said monitoring module to operate less than all functional components of said plurality of functional components, when the voltage level delivered by said photoelectric converter is not at least the same as the voltage level delivered by said energy storing unit.

5. A method for supplying power from a photoelectric converter to a detached price display unit lacking powering battery, the detached price display unit having high power consuming portions and low power consuming portions, said high power consuming portions and said low power consuming portions including a number of functional units, comprising the steps of:

providing a monitoring module;

providing an energy storing unit;

providing the detached price display unit in such a way that when said detached price display unit is in a high level driving state said detached price display unit will have all said functional units connected, while in a low level driving state functional units, of said number of functional units, being most energy demanding will be disconnected;

connecting via said monitoring module said photoelectric converter parallel to said energy storing unit and said energy storing unit via said high power consuming portions to the detached price display unit if said photoelectric converter delivers at least the same voltage level as said energy storing unit;

disconnecting by means of said monitoring module said photoelectric converter and connecting said energy storing unit to the detached price display unit via said low power consuming portions if said photoelectric converter does not deliver at least the same voltage level as said energy storing unit;

selecting a visual change appearing in a display of the detached price display unit when said photoelectric converter does not deliver any energy; and keeping said visual change in the display of said detached price display unit for a predetermined period of time after said photoelectric converter has started to deliver energy.

6. The method according to claim 5, comprising the further step of keeping said detached price display unit in said low level driving state during the predetermined period of time.

7. The method according to claim 6, comprising the further step of supplying power only to circuits necessary for the display of said detached price display unit for maintaining information in the detached price display unit when in said low level driving state.

8. The method according to claim 5, comprising the further step of supplying power only to circuits necessary for the display of said detached price display unit for maintaining information in the detached price display unit when in said low level driving state.

9. The method according to claim 5, comprising the further step of supplying power only to circuits necessary for the display of said detached price display unit for maintaining information in the detached price display unit when in said low level driving state.

* * * * *